United States Patent
Liu et al.

(10) Patent No.: US 6,782,701 B2
(45) Date of Patent: Aug. 31, 2004

(54) MASTER-SLAVE ENGINE BLEED FLOW SHARING CONTROL METHOD AND SYSTEM

(75) Inventors: Guang Jun Liu, Mississauga (CA); Chun Ho Lam, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/349,434

(22) Filed: Jan. 22, 2003

(65) Prior Publication Data

US 2004/0139751 A1 Jul. 22, 2004

(51) Int. Cl.[7] .............................. F02L 6/08; F02C 6/08
(52) U.S. Cl. ........................... 60/782; 60/785; 60/795; 454/74
(58) Field of Search .................... 60/782, 785, 795; 454/72–74

(56) References Cited

U.S. PATENT DOCUMENTS

| | | | | |
|---|---|---|---|---|
| 2,316,237 A | * | 4/1943 | Grunert et al. | 454/71 |
| 2,407,257 A | * | 9/1946 | Del Mar | 454/74 |
| 2,545,563 A | * | 3/1951 | Welch | 454/74 |
| 2,851,254 A | * | 9/1958 | Messinger et al. | 454/73 |
| 2,973,702 A | * | 3/1961 | Andresen, Jr. | 454/71 |
| 3,559,559 A | * | 2/1971 | Furlong et al. | 454/73 |
| 3,811,273 A | * | 5/1974 | Martin | 60/39.281 |
| 4,671,318 A | | 6/1987 | Benson | |
| 4,735,056 A | * | 4/1988 | Goodman | 62/172 |
| 4,765,131 A | | 8/1988 | Benson | |
| 4,779,644 A | | 10/1988 | Benson | |
| 5,063,963 A | * | 11/1991 | Smith | 137/606 |
| 5,145,124 A | * | 9/1992 | Brunskill et al. | 244/118.5 |
| 5,155,991 A | | 10/1992 | Bruun | |
| 5,927,257 A | * | 7/1999 | Hackett | 123/568.26 |
| 5,934,614 A | | 8/1999 | Mueller et al. | |
| 6,058,725 A | * | 5/2000 | Monfraix et al. | 62/172 |
| 6,494,047 B2 | * | 12/2002 | Yeung | 60/782 |

* cited by examiner

Primary Examiner—Ted Kim
(74) Attorney, Agent, or Firm—Larry J. Palguta

(57) ABSTRACT

A system and method for an engine bleed flow-sharing control system is disclosed. For a multi-engine bleed system, one (10) of the engines is selected as the master channel (15) such that the bleed air supply pressure of the control system receiving the bleed air is controlled (11, 12, 13) to achieve a desirable supply pressure range. To slave the other engine airflow control channels (25, 35, 45), the airflow rate (14) is also measured in the master channel (15) and the measured airflow rate is used as the airflow setpoint for other channels (25, 35, 45). The difference between the airflow setpoint and the airflow rate in the other channel is applied to control (21, 31, 41) the pressure or the valve/actuator opening area at the inlet of that channel (25, 35, 45).

40 Claims, 2 Drawing Sheets

MASTER-SLAVE ENGINE BLEED FLOW SHARING CONTROL METHOD AND SYSTEM

FIELD OF THE INVENTION

The present invention relates to equipment used on aircraft to derive conditioned compressed air from a multi-engine power source to other on-board systems requiring a continuous supply of air, such as environmental control systems ("ECS"), and more particularly to a system and method of controlling bleed air supplied by the engines in order to ensure an equalized supply of bleed air from each of the engines on the aircraft, thereby achieving balanced flow extraction.

ART BACKGROUND

Most aircraft utilizing turbine engine propulsion units, both commercial and military, are powered by two or more turbine engines. Virtually all such aircraft divert bleed air from the engines to supply various other systems, most notably the ECS which requires a supply of conditioned air to be utilized for the crew, passengers and electronic equipment environment. In some instances the aircraft de-icing system also uses a portion of the conditioned bleed air.

It has been recognized for some time that in order to more efficiently operate a multi-engine aircraft, it is desirable to extract bleed air from all of the engines equally rather than from only one power plant. If, for example, the entire supply of bleed air to the aircraft is supplied by one engine, the result deteriorates the overall fuel economy, as well as increases wear to the engine supplying the bleed air, since that engine also has to carry its share of the aircraft propulsion duties.

Some of such systems have been disclosed in U.S. Patents. For example, one U.S. Pat. No. 5,155,991, entitled "BLEED AIR FLOW REGULATORS WITH FLOW BALANCE," issued to Bruun, discloses a bleed air flow sharing technique for a two engine system, that uses a venturi and a pressure sensor to estimate the bleed flow in each engine flow path. The differences in the two flow signals is then conditioned to drive the pressure regulator in each engine bleed flow path.

Another two U.S. Pat. Nos. 4,779,644 and 4,765,131, both entitled "AIRCRAFT ENGINE BLEED AIR FLOW BALANCING TECHNIQUE," issued to Benson, disclose a bleed flow control method for each engine using a pressure regulator upstream of a heat exchanger. Since the bleed air pressure drop across the heat exchanger is a function of the flow rate, the pressure drop is used as the feedback signal to control the flow rate.

Yet another U.S. Pat. No. 5,934,614, entitled "CLOSED LOOP CONTROL SYSTEM FOR CONTROLLING AN AIR DISCHARGE OUT OF AN AIRCRAFT BODY," issued to Mueller et al., discloses a fault tolerant control scheme to control multiple air outflow valves for aircraft cabin pressure controls. The "master" in this system refers to a controller which can send a control signal to the valve controller, termed as "slave controller", to command the valve. In this case, the slave controller can also send control information (e.g., cabin pressure value, etc.) back to the master controller to enable the master controller to achieve redundant and fault tolerant controls. This system, however, does not address the bleed flow control or flow sharing among engines at all.

Despite all the efforts, balancing bleed flow extraction by the conventional systems has not been entirely satisfactory. The most noticeable trade-off has been diminished fuel economy, since the engine supplying significantly more bleed air will burn more fuel than the other engine saves. Such a reduction in fuel economy will have economic results, particularly in the case of commercial aircraft.

A second, and even more expensive, trade-off is an increased level of engine distress. The engine required to supply substantially more bleed air will tend to wear out faster, since the engine will be running hotter, to compensate for the increased amount of bleed air tapped off. This results in the requirement that the engine be overhauled or replaced at an earlier time, resulting in fewer operating hours on the engine.

While the previous discussion has concentrated on the example of a twin engine aircraft, it is apparent that the airflow and pressure regulation problem will be more severe on aircraft having more than two engines. For example, if a four engine aircraft has one pressure regulating valve supplying air at higher pressure than the other three, it is possible for that pressure regulating valve to swamp out the other three regulating valves, thereby resulting in a single engine to supply all the bleed air utilized by the aircraft. The results in this case are an unacceptably serious reduction in both fuel economy and engine wear characteristics.

Therefore, it has been desirable to have a system that can equalize the bleed air extraction from each engine, since such a system would result in better aircraft economy and a lower degree of mechanical wear in the engine. Such a system will likely pay for itself in a relatively short operating time, and therefore represents a worthwhile improvement to any bleed air control system.

SUMMARY OF THE PRESENT INVENTION

A system and method for an engine bleed flow-sharing control system is disclosed. For a multi-engine bleed system, one of the engines is selected as the master channel such that the pressure at the inlet of the systems down stream receiving the bleed air is controlled to achieve a desirable inlet pressure range. To slave the other engines' airflow control channels, the airflow rate is also measured in the master channel and the measured master airflow rate is used as the airflow setpoint for the slave channels. The difference between the airflow setpoint and the airflow rate in the slave channel is applied to control the pressure, or a valve opening area, of that slave channel.

In another embodiment of the present invention, the pressure within the master control channel is controlled by applying the difference between a pressure setpoint and the pressure in the master control channel. Similarly, to slave the other engines' airflow control channels, the airflow rate is also measured in the master channel and the measured master airflow rate is used as the airflow setpoint for the slave channels. The difference between the airflow setpoint and the airflow rate in the slave channel is applied to control the pressure, or a valve opening area, of that slave channel.

DETAILED DESCRIPTION OF THE PREFERRED EMBODIMENT

A master-slave engine bleed flow sharing control method and system are disclosed. In the following detailed description, numerous specific details are set forth to provide a full understanding of the present invention. In other instances, well-known structures or components have not been shown in detail so as to avoid unnecessarily obscuring the present invention.

Figure 1:
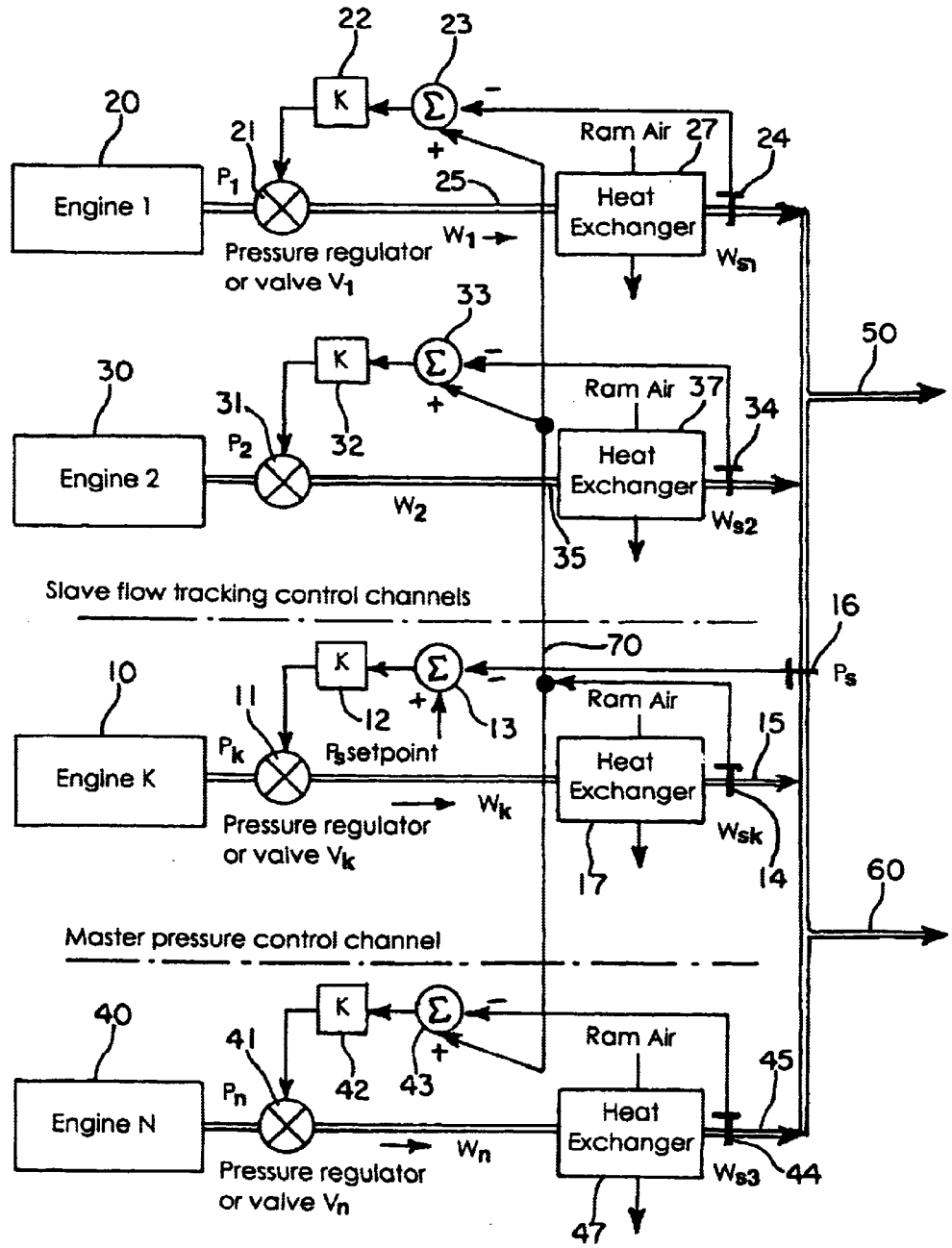
FIG. 1 illustrates a simplified system diagram of an exemplary master-slave engine bleed flow sharing control in accordance with a first embodiment of the present invention.

Reference is to FIG. 1, where a simplified system diagram of an exemplary master-slave engine bleed flow sharing control for a multiple engine system is illustrated. As shown, bleed air is extracted from engines 10, 20, 30, 40 for delivery to common air duct 50, 60, such that the extracted bleed air can be used by other systems on-board of the aircraft. Channel 15 for engine K 10 is designated as the master channel to pass the bleed air from engine K 10 to common air duct 50, 60. Channels 25, 35, 45 associated with other engines 20, 30, 40, respectively, are designated as the slave channels for passing the bleed air from their corresponding engines to common air duct 50, 60.

In the master channel 15 of engine K 10, master valve 11 is connected at the inlet of the master channel 15, responding to the pressure ($P_k$) of the bleed air supply received from engine K 10. Downstream from master valve 11 is master flow sensor 14, which measures the air flow rate ($W_k$) In the master channel 15, resulting in sensor value $W_{sk}$. A master controller, formed by summing junction 13 and controller/amplifier unit 12, compares the pressure ($P_s$) measured at pressure sensor 16 of common air duct 50, 60 with a set-point pressure. The difference representative of the set-point pressure subtracted by measured pressure ($P_g$) from pressure sensor 16 is amplified by controller/amplifier unit 12. This controller/amplifier unit 12 can operate based on pneumatic, fluidic, electronic or other commonly-known principles matching the sensor and actuator types used to implement the control system. The amplified signal is then used to control master valve 11, which can either be a pressure regulator or a conventional valve/actuator. Note that the set-point pressure represents a desired pressure for the system to maintain.

At the inlets of the slave channels 25, 35, 46, slave valves 21, 31, 41 are connected to pressures sources ($P_1, P_2, P_n$) of the bleed air supply received from their corresponding engines. Downstream of channels 25, 35, 45 from slave valves 21, 31, 41 are flow sensors 24, 34, 44, respectively, which measure the air flow rate ($W_1, W_2, W_n$) in the corresponding slave channel, resulting in sensor values $W_{s1}, W_{s2}, W_{s3}$. Each slave channel also has a slave controller, which is implemented by summing junction 23, 33, 43 and controller/amplifier unit 22, 32, 42, respectively. The slave controller compares the air flow rate ($W_1, W_2, W_n$) in its respective channel ("slave flow rate") with th airflow rate ($W_k$) measured from master channel 15 ("master air flow rate"). The value representative of the master air flow rate subtracted by the slave flow rate, after it is amplified by the controller/amplifier unit, used to control slave valves 21, 31, 41 of the slave channels.

Referring to FIG. 1, it should be pointed out that at each channel, 15, 25, 35, 45, a heat exchanger 17, 27, 37, 47, respectively, is implemented to provide cooling of the bleed air so as to reduce the overall temperature of the bleed air streams entering the loads down stream. For each heat exchanger, cooling air is drawn from the ambience, as is well known by those skilled in the art.

The aforementioned section indicates one embodiment of the flow control mechanism of the present invention using a pressure regulator at each slave channel. Another embodiment of the flow control mechanism to achieve the identical slave flow control objective is to use a conventional valve or an actuator, instead of a pressure regulator. In this case, the value representative of the master air flow rate subtracted by the slave flow rate, after it is amplified by the controller/amplifier unit, is used to control slave valves 21, 31, 41 valve opening areas of the slave channels.

To physically implement the bleed air flow sharing control system in accordance with the present invention, the flow sensor 14, 24, 34, 44 can be the kind that is based on electronic, pneumatic, fluidic, ultrasonic, electromagnetic, pressure (e.g. delta P), heat transfer/thermal (e.g. anemometer), vibration, ionic -type sensor or other principles. The controller 12/13, 22/23, 32/33, 42/43 can be either digital/analog, pneumatic, fluidic or other principles as well as any combination of these principles. The summing junction 13, 23, 33, 43 can also be digital/analog, pneumatic, fluidic or other principles. The valve 11, 21, 31, 41 can be a pressure regulator or valve/actuator which varies its valve/actuator area as regulated by the valve/actuator control signal.

During operation of the bleed airflow sharing control system in accordance with the present invention, the pressure ($P_k$) at the inlet of the master channel receiving the bleed air supply can be controlled to achieve the desirable inlet pressure range. The master air flow rate ($W_k$) of the master channel is measured, which is utilized as the set-point air flow to slave the other engines' air flow control channels.

In the case of a two-engine system, one of the channels is selected as the master channel, and the pressure is controlled based on the pressure sensor feedback at their common air duct. The mass flow rate is also measured in the master channel, and the flow sensor output of the master channel is utilized as the commanded input to the slave channel, which is flow controlled.

Figure 2:
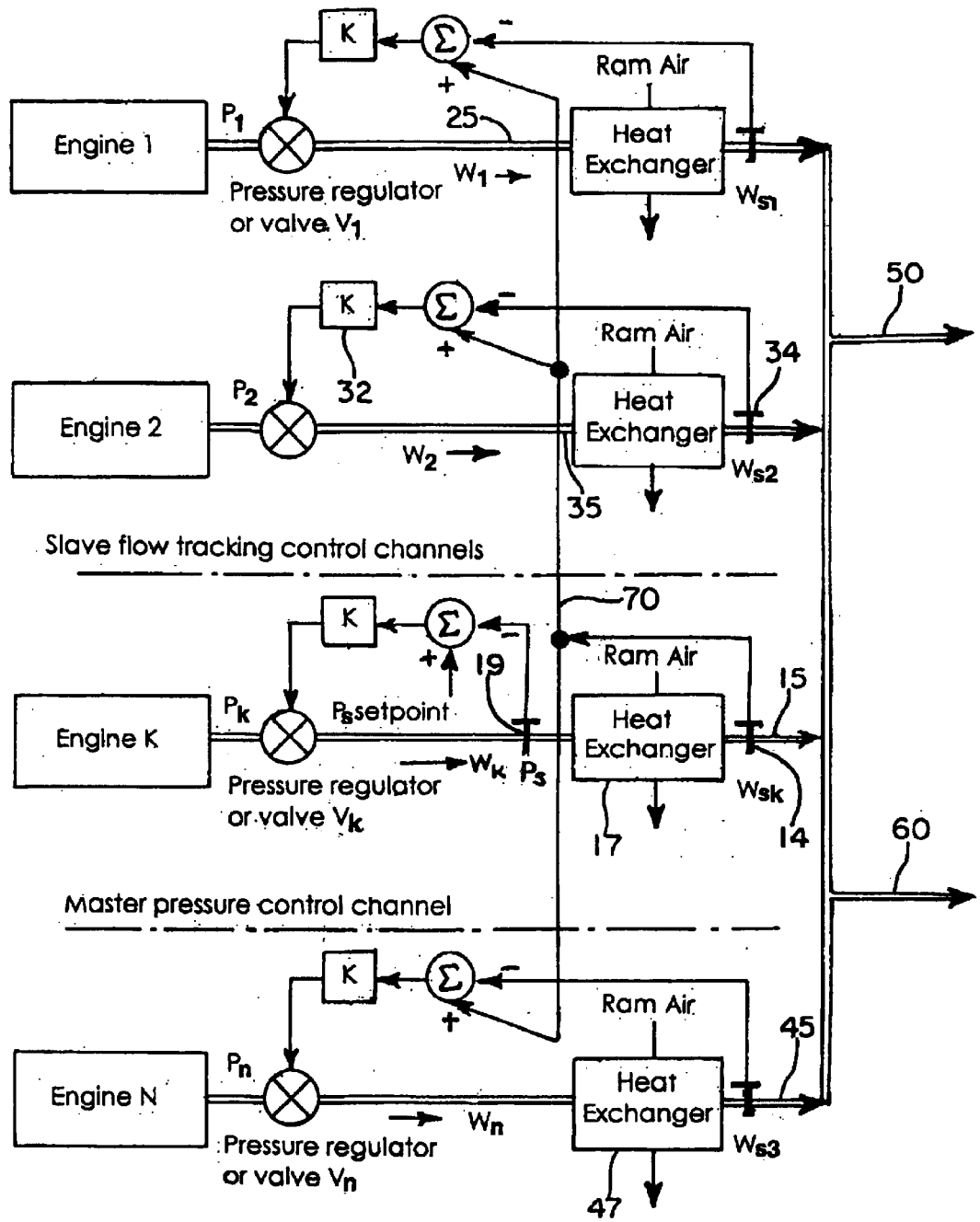
FIG. 2 illustrates a simplified system diagram of an exemplary master-slave engine bleed flow sharing control in accordance with a second embodiment of the present invention.

Reference is now to FIG. 2, where a simplified system diagram of yet another exemplary master-slave engine bleed flow sharing control is illustrated. As illustrated, this embodiment has essentially the same construction as the previous embodiment. However, instead of measuring the pressure at common air duct 50, 60, pressure ($P_s$) is measured by sensor 19 just down stream of master valve 11 in master channel 15. The slave controls for bleed air flow in the slave channels 25, 35, 45 remain the same as the previous embodiment.

The flow sharing control of the present invention minimizes competitive flow controls among all channels. The strong control coupling among the engine flow and pressure controls is reduced, resulting in a stable and accurate flow balancing system. The present invention enables the bleed airflow extraction to be equalized for each engine, without the need to know the total flow demand from the on-board systems where the bleed air is used. As such, the present invention achieves a self-contained system and can work independent of the ECS, or other load demands and controllers.

We claim:

1. A system for substantially equalizing the flow of bleed air extracted from a plurality of engines for delivery to a common bleed air duct, comprising:

a common pressure sensor disposed to measure pressure at said common bleed air duct and generate a measured pressure signal;

a master channel disposed to pass engine bleed air from a master engine to said common bleed air duct, said master channel comprising:

a master valve disposed to receive bleed air supply from said master engine and regulate bleed air supply pressure;

a master flow sensor disposed downstream from said master valve to measure bleed air flow to generate a master flow signal;

a master controller disposed to compare a predetermined pressure signal with said measured pressure signal to generate a master error signal, said master error signal being applied to control said master valve;

at least one slave channel disposed to pass engine bleed air from at least one slave engine to a common bleed air duct;

a slave valve disposed to receive bleed air from said slave engine and regulate bleed airflow;

a slave flow sensor disposed downstream from said slave valve to measure bleed airflow and generate a slave flow signal;

a slave controller disposed to compare said master flow signal with said slave flow signal to generate a slave flow error signal, said slave flow error signal being applied to control said slave valve.

2. The system of claim 1, wherein:

said master controller comprises:

a master summing junction disposed to receive said predetermined pressure signal and said measured pressure signal, said summing junction disposed to generate an error signal by subtracting said measured pressure signal from said predetermined pressure signal;

a master controller/amplifier disposed to amplify said error signal and apply the amplified error signal to said master valve;

said slave controller comprises:

a slave summing junction disposed to receive said master flow signal and said slave flow signal, said slave summing junction disposed to generate an error signal by subtracting said slave flow signal from said master flow signal;

a slave controller/amplifier disposed to amplify said error signal and apply the amplified error signal to said slave valve.

3. The system of claim 1, wherein each of said master and slave valves is pressure regulator controllably operated by said master controller and said slave controller, respectively.

4. The system of claim 1, wherein each of said master and slave valves comprises one of a valve and an actuator having an area controllably operated by said master controller and said slave controller, respectively.

5. The system of claim 1, wherein each of said master and slave flow sensors comprise a delta-P transducer.

6. The system of claim 1, wherein each of said master and slave flow sensors comprises an anemometer.

7. The system of claim 1, wherein each of said master and slave flow sensors is one of a fluidic, a pneumatic, a ultrasonic and an electromagnetic sensor.

8. The system of claim 1, wherein each of said master and slave controllers is one of a digital/analog or a pneumatic controller.

9. The system of claim 1, wherein each of said master and slave controllers is a fluidic controller.

10. A system for substantially equalizing the flow of bleed air extracted from a plurality of engines for delivery to a common bleed air duct, comprising:

common pressure sensor means for measuring pressure of bleed air of said common bleed air duct and generating a measured pressure signal;

a master channel disposed to pass engine bleed air from a master engine to said common bleed air duct, said master channel comprising:

master valve means for receiving bleed air supply from said master engine and regulating bleed air supply pressure;

master flow sensor means coupled to said master valve means for measuring bleed air flow and generating a master flow signal;

master controller means for controlling said master valve means by comparing a predetermined pressure signal with said measured pressure signal;

a slave channel disposed to pass engine bleed air from a slave engine to a common bleed air duct;

slave valve means for receiving bleed air from said slave engine and regulating one of pressure of bleed airflow and valve opening area;

slave flow sensor means for measuring bleed airflow and generating a slave flow signal;

slave controller means for controlling said slave valve means, by comparing said master flow signal with said slave flow signal.

11. A system of claim 10, wherein said salve controller means comprises:

a summing junction disposed to subtract said slave flow signal from said master flow signal to generate a slave error signal;

a controller/amplifier unit disposed to amplify said slave error signal.

12. A system of claim 10, wherein said master controller means comprises:

a summing junction disposed to subtract said measured pressure signal from said predetermined pressure signal to generate a master error signal;

a controller/amplifier unit disposed to amplify said master error signal.

13. The system of claim 10, wherein each of said master and slave valve means comprises a pressure regulator.

14. The system of claim 10, wherein each of said master and slave valve means comprises one of a valve and an actuator.

15. A system for substantially equalizing the flow of bleed air extracted from a plurality of engines for delivery to a common bleed air duct, comprising:

a master channel disposed to pass engine bleed air from a master engine to said common bleed air duct, said master channel comprising:

a master valve disposed to receive bleed air supply from said master engine and regulate pressure of bleed air supply in said master channel;

a common pressure sensor disposed downstream from said master valve to measure pressure of bleed air of said master channel and generate a measured pressure signal;

a master flow sensor disposed downstream from said master valve to measure bleed air flow of said master channel to generate a master flow signal;

a master controller disposed to control said master valve, by comparing a predetermined pressure signal with said measured pressure signal to generate a master error signal;

at least one slave channel disposed to pass engine bleed air from at least one slave engine to a common bleed air duct;

a slave valve disposed to receive bleed air from said slave engine and regulate one of pressure of bleed air flow and valve opening area in said slave channel;

a slave flow sensor disposed downstream from said slave valve to measure bleed air flow of said slave channel and generate a slave flow signal;

a slave controller disposed to control said slave valve, by comparing said master flow signal with said slave flow signal to generate a slave error signal.

16. The system of claim 15, wherein:
said master controller comprises:
  a master summing junction disposed to receive said predetermined pressure signal and said measured pressure signal, said summing junction disposed to generate an error signal by subtracting said measured pressure signal from said predetermined pressure signal;
  a master controller/amplifier disposed to amplify said error signal and apply the amplified error signal to said master valve;
said slave controller comprises:
  a slave summing junction disposed to receive said master flow signal and said slave flow signal, said slave summing junction disposed to generate an error signal by subtracting said slave flow signal from said master flow signal;
  a slave controller/amplifier disposed to amplify said error signal and apply the amplified error signal to said slave valve.

17. The system of claim 15, wherein each of said master and slave valves is pressure regulator controllably operated by said master controller and said slave controller, respectively.

18. The system of claim 15, wherein each of said master and slave valves comprises one of a valve and an actuator having an area controllably operated by said master controller and said slave controller, respectively.

19. The system of claim 15, wherein each of said master and slave flow sensors comprise a delta-P transducer.

20. The system of claim 15, wherein each of said master and slave flow sensors comprises an anemometer.

21. The system of claim 15, wherein each of said master and slave flow sensors is a fluidic sensor.

22. The system of claim 15, wherein each of said master and slave flow sensors is an ultrasonic sensor.

23. The system of claim 15, wherein each of said master and slave flow sensors is an electromagnetic sensor.

24. The system of claim 15, wherein each of said master and slave controllers is one of a digital/analog and a pneumatic controller.

25. The system of claim 15, wherein each of said master and slave controllers is a fluidic controller.

26. A system for substantially equalizing the flow of bleed air extracted from a plurality of engines for delivery to a common bleed air duct, comprising:
  a master channel disposed to pass engine bleed air from a master engine to said common bleed air duct, said master channel comprising:
    master valve means for receiving bleed air from said master engine and regulating pressure of bleed air flow in said master channel;
    master pressure sensor means for measuring pressure of said master channel and generating a measured pressure signal;
    master flow sensor means coupled to said master valve means for measuring bleed air flow of said master channel and generating a master flow signal;
    master controller means for controlling said master valve means by comparing a predetermined pressure signal with said measured pressure signal;
  a slave channel disposed to pass engine bleed air from a slave engine to a common bleed air duct;
    slave valve means for receiving bleed air from said slave engine and regulating one of pressure of bleed air flow and valve/actuator opening area in said slave channel;
    slave flow-sensor means for measuring bleed airflow of said slave channel and generating a slave flow signal;
    slave controller means for controlling said slave valve means, by comparing said master flow signal with said slave flow signal.

27. A system of claim 26, wherein said salve controller means comprises:
  a summing junction disposed to subtract said slave flow signal from said master flow signal to generate a slave error signal;
  a controller/amplifier unit disposed to amplify said slave error signal.

28. A system of claim 26, wherein said master controller means comprises:
  a summing junction disposed to subtract said measured pressure signal from said predetermined pressure signal to generate a master error signal;
  a controller/amplifier unit disposed to amplify said master error signal.

29. The system of claim 26, wherein each of said master and slave valve means comprises a pressure regulator.

30. The system of claim 26, wherein each of said master and slave valve means comprises one of a valve and an actuator.

31. A method of substantially equalizing bleed air flow of a plurality of channels from a plurality of engines to a common air duct, comprising the steps of:
  a) designating a master channel and a plurality of slave channels from among said channels;
  b) obtaining master error signal based on a difference between pressure at said common air duct and a predetermined setpoint pressure;
  c) regulating pressure of said master channel by using said master error signal;
  d) measuring airflow rate of said master channel to generate master airflow rate;
  e) measuring airflow rate of each slave channel to generate slave airflow rate;
  f) obtaining slave error signal based on a difference between said master airflow rate and said slave airflow rate of a corresponding slave channel;
  g) regulating one of pressure and valve/actuator opening area of each slave channel by using said slave error signal.

32. The method of claim 31, wherein the step of obtaining master error signal comprises:
  subtracting said pressure at said common air duct from said predetermined setpoint pressure to generate a difference signal;
  amplifying said difference signal to generate said master error signal.

33. The method of claim 32, wherein the step d) of measuring airflow comprises using an airflow sensor.

34. The method of claim 32, wherein the step e) of measuring airflow rate comprises using an airflow sensor.

35. The method of claim 31, wherein the step of obtaining slave error signal comprises:
  subtracting slave airflow rate from master airflow rate to generate a difference signal;
  amplifying said difference signal to generate said slave error signal.

36. A method of substantially equalizing bleed air flow of a plurality of channels from a plurality of engines to a common air duct, comprising the steps of:
  a) designating a master channel and a plurality of slave channels from among said channels;

b) obtaining master error signal based on a difference between pressure at said master channel and a predetermined setpoint pressure;

c) regulating pressure of said master channel by using said master error signal;

d) measuring airflow rate of said master channel to generate master airflow rate;

e) measuring airflow rate of each slave channel to generate slave airflow rate;

f) obtaining slave error signal based on a difference between said master airflow rate and said slave airflow rate of a corresponding slave channel;

g) regulating one of pressure and valve/actuator opening area of each slave channel by using said slave error signal.

37. The method of claim 36, wherein the step of obtaining master error signal comprises:

subtracting said pressure of said master channel from said predetermined setpoint pressure to generate a difference signal;

amplifying said difference signal to generate said master error signal.

38. The method of claim 37, wherein the step d) of measuring airflow comprises using an airflow sensor.

39. The method of claim 37, wherein the step e) of measuring airflow rate comprises using an airflow sensor.

40. The method of claim 37, wherein the step of obtaining slave error signal comprises:

subtracting slave airflow rate from master airflow rate to generate a difference signal;

amplifying said difference signal to generate said slave error signal.

* * * * *

UNITED STATES PATENT AND TRADEMARK OFFICE
CERTIFICATE OF CORRECTION

PATENT NO. : 6,782,701 B2
DATED : August 31, 2004
INVENTOR(S) : Liu et al.

It is certified that error appears in the above-identified patent and that said Letters Patent is hereby corrected as shown below:

Title page,
Item [73], Assignees, following "Honeywell International Inc., Morristown, NJ (US)", please insert -- Ryerson University, Toronto, ON (Canada) --.

Signed and Sealed this

Twenty-fourth Day of May, 2005

JON W. DUDAS
*Director of the United States Patent and Trademark Office*